United States Patent [19]

Brandman et al.

[11] Patent Number: 5,483,580
[45] Date of Patent: Jan. 9, 1996

[54] METHODS AND APPARATUS FOR NON-SIMULTANEOUS TRANSMITTAL AND STORAGE OF VOICE MESSAGE AND DIGITAL TEXT OR IMAGE

[75] Inventors: Yigal Brandman, Palo Alto; Charlotte Koerschen, Menlo Park; Frank C. H. Lin, Saratoga; Peter D. Olson, Los Gatos; Shahryar Soroosh, Saratoga; Jason Subramaniam, Fremont; Bruce Todd, Los Gatos, all of Calif.

[73] Assignee: Octel Communications Corporation, Milpitas, Calif.

[21] Appl. No.: 33,618

[22] Filed: Mar. 19, 1993

[51] Int. Cl.$^6$ .................................................. H04M 1/64
[52] U.S. Cl. .............................. 379/88; 379/67; 379/100; 358/402
[58] Field of Search .............................. 329/67, 88, 89, 329/90, 83, 97, 100; 358/402, 403

[56] References Cited

U.S. PATENT DOCUMENTS

| | | | |
|---|---|---|---|
| 4,837,798 | 6/1989 | Cohen et al. | 379/88 |
| 4,918,722 | 4/1990 | Duehren et al. | 379/100 |
| 5,008,926 | 4/1991 | Misholi | 379/100 |
| 5,033,804 | 7/1991 | Faris | 379/93 |
| 5,068,888 | 11/1991 | Scherk et al. | 379/100 |
| 5,127,003 | 6/1992 | Doll, Jr. et al. | 379/94 |
| 5,129,016 | 7/1992 | Murakami et al. | 358/403 |
| 5,193,110 | 3/1993 | Jones et al. | 379/94 |
| 5,196,943 | 3/1993 | Hersee et al. | 379/88 |
| 5,237,430 | 8/1993 | Sakurai | 358/444 |
| 5,239,466 | 8/1993 | Morgan et al. | 395/148 |
| 5,291,302 | 3/1994 | Gordon et al. | 358/400 |
| 5,311,573 | 5/1994 | Otsuki | 379/67 |
| 5,333,266 | 7/1994 | Boaz et al. | 395/200 |
| 5,339,169 | 8/1994 | Meguro et al. | 358/403 |

FOREIGN PATENT DOCUMENTS

| | | |
|---|---|---|
| 61-60060 | 3/1986 | Japan . |
| 1311753 | 12/1989 | Japan . |
| 2211698 | 7/1989 | United Kingdom . |

OTHER PUBLICATIONS

*FaxMemo* Product Literature, Centigram Communications Corporation, Apr. 1991.
*Integrated Voice/Fax Mail* Product Literature, Digital Sound Corporation, 1992.
*Fax Management, AudioFax Classes of Service, Series 100 and 300 Application Note*, AudioFAX, Inc., 1992.
"Brooktrout unveils 4-port voice/facsimile/data card", Network World, Jul. 27, 1992.
"The Universal Port", product brochure, Brooktrout Technology, circa Jun. 1992.
"A New Twist in Fax", Teleconnect, Jan. 1988, p. 39.

*Primary Examiner*—Jeffery A. Hofsass
*Assistant Examiner*—Scott L. Weaver
*Attorney, Agent, or Firm*—Fish & Neave; Nicola A. Pisano

[57] ABSTRACT

Apparatus and methods are provided for non-simultaneously creating and storing in electronic format a composite voice/data message having a recorded voice message portion and a facsimile transmittal portion. The method provides for creating a voice message and sending a time-wise separated facsimile transmittal to a voice message/data storage system, and then associating the separate voice message and facsimile transmittal portions to form a composite voice/data message. The methods include a message identification scheme wherein a message identification number is assigned to the first-received message portion, and the caller is prompted to provide that message identification number in connection with the later-received message portion. Apparatus to accomplish these methods steps is also provided.

30 Claims, 2 Drawing Sheets

METHODS AND APPARATUS FOR NON-SIMULTANEOUS TRANSMITTAL AND STORAGE OF VOICE MESSAGE AND DIGITAL TEXT OR IMAGE

This invention relates to methods and apparatus for transmitting and storing voice messages and electronic representations of text or images or both, and particularly to non-simultaneous transmittal of separate portions of a composite voice/data message.

BACKGROUND OF THE INVENTION

Contemporary business has embraced two technologies that allow an individual employee to be more efficient and productive. The first of these technologies is voice messaging technology. In conventional voice messaging technology, a caller first calls an intended recipient by telephone. If the recipient of the call is absent, the caller is automatically connected to the recipient's voice messaging system. This system enables the caller to record a message for the recipient-subscriber in the caller's own voice, which message is then stored in an electronic format by the system. When subscriber calls into the system, he can play back the voice message on his telephone by issuing suitable commands.

The second technology effecting modern business practices is the facsimile machine or telecopier, which enables a sender to transmit a text or visual image (collectively "data") via electronic medium to a remote location, where the text or image may be printed out. Conventional facsimile technology requires telecopy equipment at both the sending and receiving stations, the first to encode the transmittal into electronic format and the latter to decode the transmittal back to a text or visual image suitable for printing.

Voice messaging and telecopy technologies have freed the employee from his office, and have enabled the businessman to conduct a large part of his work away from his home office. By calling in to his office from a remote location, the executive can listen to voice messages. Likewise, the facsimile machine has enabled the businessman to receive text or visual images virtually anywhere in the world accessible by public telephone lines.

An evolution of facsimile technology is the ongoing development of methods and apparatus for receiving and storing in electronic format the electronic representation of a facsimile transmittal. Such systems, known generically as "Fax Mail" systems, permit an incoming telecopy transmittal to be stored on a data storage system in electronic form, for later recall by the system subscriber. In this manner, the intended recipient may, for example, call into the office from a remote location, determine that a facsimile transmittal is available for him, and then direct that the text or image stored on the system be transmitted for printout to a facsimile machine at the remote location.

An adjunct to "Fax Mail" technology is the annotation of facsimile transmittals with a voice message, wherein the voice message is recorded in the caller's own voice. Such previously known systems—"composite voice/data" message systems—contemplate that a caller will call the recipient's voice messaging system using the telephone handset found on the facsimile equipment, record a voice message concerning the impending facsimile transmission, and then send the facsimile transmission as a continuous part of the call. Thus, the resulting call is "simultaneous" in the sense that the telephone call and the facsimile transmittal are part of a single transaction. A subscriber to the system can then dial into the system from a remote location, listen to the voice portion of the message, and direct the disposition, i.e., printout or storage, of the facsimile portion.

Such simultaneous composite voice/data message systems have the inherent drawback that the sender of the facsimile transmittal must be physically present at the facsimile machine in order to record the voice portion of the message. On the other hand, if—as is typical for most large businesses—the facsimile machine is located in a mail center, it may not be possible for the sender of the facsimile to provide the desired voice annotation of the transmittal. This is because he will typically not be present when the facsimile transmittal is actually sent. While the sender could call the recipient from his desk and leave a voice message that a facsimile is being or will be sent, previously known methods and systems of voice/data processing do not enable the voice portion of the message to be matched up with its corresponding facsimile portion.

If the recipient in the above scenario receives only one voice message and one facsimile transmittal, he would have little problem in determining their relationship. If, however, several voice messages and facsimile transmittals were to be received, the recipient may have to waste a considerable amount of time determining which voice message corresponds to each of the facsimile transmittals. This problem could be especially acute, for example, where several drafts of a document are sent to the recipient within a relatively short period, for example, as in time-sensitive contract negotiations.

It would therefore be desirable to provide a method for annotating a facsimile transmittal to be stored in electronic format with a voice message, wherein the voice message and facsimile transmittal are created non-simultaneously.

It would further be desirable to provide apparatus for matching a facsimile transmittal stored in electronic format with a timewise separated voice message to form a composite voice/data message.

It would further be desirable to provide methods for printing out a facsimile transmittal from electronic storage wherein the print out includes indicia that permits the facsimile transmittal to be matched up with a voice message.

SUMMARY OF THE INVENTION

In view of the foregoing, it is an object of the present invention to provide methods and apparatus for annotating a facsimile transmittal to be stored in electronic format with a voice message, so that the voice message and facsimile transmittal may be transmitted non-simultaneously.

It is another object of this invention to provide methods and apparatus for associating a facsimile transmittal stored in electronic format with a timewise separated voice message to form a composite voice/data message.

It is yet another object of this invention to provide methods for printing out a facsimile transmittal from electronic storage so that the print out includes indicia that permits the facsimile transmittal to be matched up with a voice message.

These and other objects are accomplished in accordance with the principles of the present invention by providing methods and apparatus that enable a caller to call into a recipient-subscriber's voice messaging data storage system and record a message concerning a specific facsimile transmittal, and then send the facsimile transmittal to that storage system using facsimile equipment. The timewise separated voice message and facsimile transmittal are linked by the recipient's system. Thus, when the subscriber calls into the system, he is apprised of the existence of a composite voice/data message. The subscriber may then listen to the voice portion of the composite message, while directing printout of the facsimile portion to a conveniently located facsimile machine or appropriately configured personal computer.

The methods and apparatus of the present invention provide a message identification number that is used by the system to link up the timewise separated voice message and facsimile transmittal. In an embodiment where the caller records a voice message before sending the facsimile transmittal, the caller informs the system that he is sending a composite voice/data message. Either before or after the recording the voice message, the caller is given a message identification number by the voice messaging/data storage system. When the facsimile transmittal is later sent, the same or a different caller again calls the subscriber's system, enters the message identification number previously provided by the system, and then sends the facsimile transmittal.

The apparatus of the present invention comprises an electronic storage system that interfaces with a telephone system and is capable of storing both voice messages and facsimile transmittals in electronic format. The system includes a central processing unit that interacts with the caller to provide prompts as required to obtain information from, and provide information to, the caller concerning whether the caller desires to leave a voice message, a facsimile transmittal, or a composite voice/data message. If the caller informs the system that he desires to create a non-simultaneous composite voice/data message, the system provides the caller with a message identification number, either before or after the voice message has been recorded. When the caller again calls to send the facsimile transmittal, the system prompts the caller to enter the previously-provided message identification number. The system then uses the identification number to match the voice portion of the message with the facsimile transmittal to form the composite voice/data message that is presented to the subscriber. The system also provides the ability to direct the facsimile transmission portion of the composite voice/data message at a designated printer or facsimile machine for printing, wherein the print out may include a banner including indicia, for example, the message identification number, concerning to which composite voice/data message the print out pertains.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DESCRIPTION OF THE PREFERRED EMBODIMENTS

In overview, the voice messaging/data storage system of the present invention is connected to a central office telephone switch and is capable of intercepting calls when the call recipient is absent. The system comprises an electronic storage system capable of interfacing with a public switch telephone network or a private branch exchange/central office system, and includes an electronic storage medium capable of storing both voice messages and facsimile transmittals in electronic format.

When there is no answer for an incoming call, the system acquires control of the call and interacts with the caller, providing pre-programmed prompts as required to obtain information from, and provide information to, the caller. These prompts concern, for example, whether the caller desires to leave a voice message, a facsimile transmittal, or a composite voice/data message. The voice message or data sent by the caller is stored in electronic format for subsequent playback or print out, or both, by the call recipient.

Figure 1:
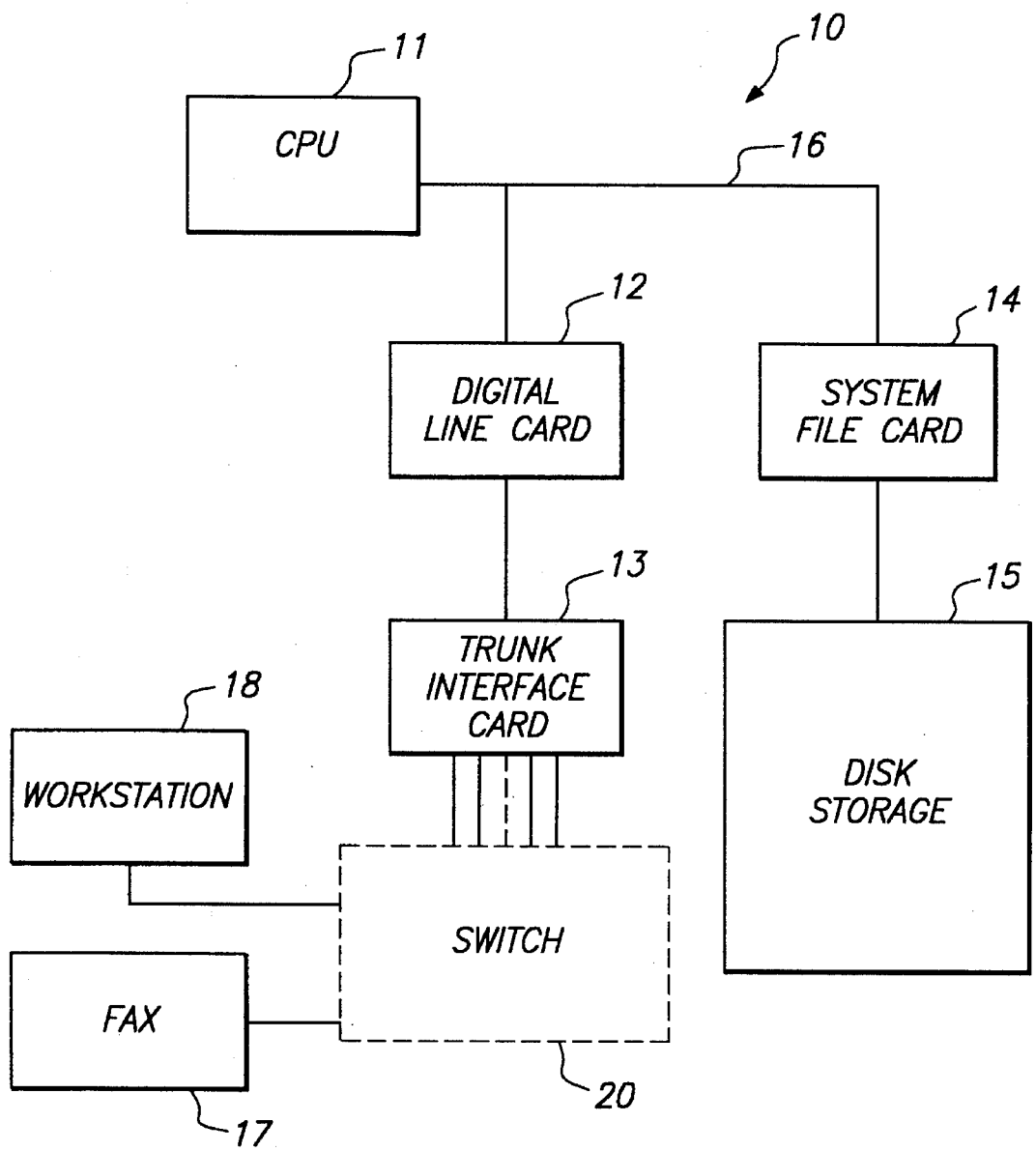
FIG. 1 is a block diagram of a voice messaging/data storage system constructed in accordance with the present invention.

Referring to FIG. 1, voice messaging/data storage system 10 in accordance with the present invention is described. The system comprises central processing unit (CPU) 11, digital line card 12, trunk interface card (TIC) 13, system file card 14 and data storage device 15. Components 11 through 15 are interconnected via communications bus 16.

Trunk interface card 13 couples digital line card 12 to the subscriber's telephone switch 20. Incoming calls are passed via TIC card 13 to digital line card 12, which processes the incoming signal and makes it available on bus 16.

System file card 14 is coupled to data storage device 15, for example a conventional disk drive. Data storage device 15 stores the system files, subscriber profiles, voice greetings and preprogrammed prompts, and incoming voice messages, facsimile transmittals and composite voice/data messages received by the system in electronic format.

Central processing unit 11, which may be, for example, a 86C386 microprocessor, available from Intel Corporation, Santa Clara, Calif., controls the data transfer over bus 16 between digital line card 13, and system file card 14. In accordance with the present invention, digital line card 12 includes a digital signal processing (DSP) semiconductor chip, for example, a Texas Instruments TMS 320C31, that functions as a single channel port for both voice and data communications. The DSP chip may be programmed using, for example, C-assembler programming language, so that chip has the ability to discriminate between incoming voice (analog) signals and digital transmissions (fax protocol and modem). This capability enables system 10 to switch between facsimile reception modes and interactive, voice activated modes.

Other than the digital line card described above, the components of the apparatus of the present invention may be commercially available, for example the Aspen Voice Messaging System, available from Octel Communications Corporation, Milpitas, Calif. Using conventional programming techniques, one skilled in the art may program the system in accordance with the process diagrams described below with respect to FIG. 2. In addition to the digital line card, it is the programming of the system in accordance with the processing methods described hereinafter that provides heretofore unavailable advantages with respect to non-simultaneously creating composite voice/data messages.

Figure 2:
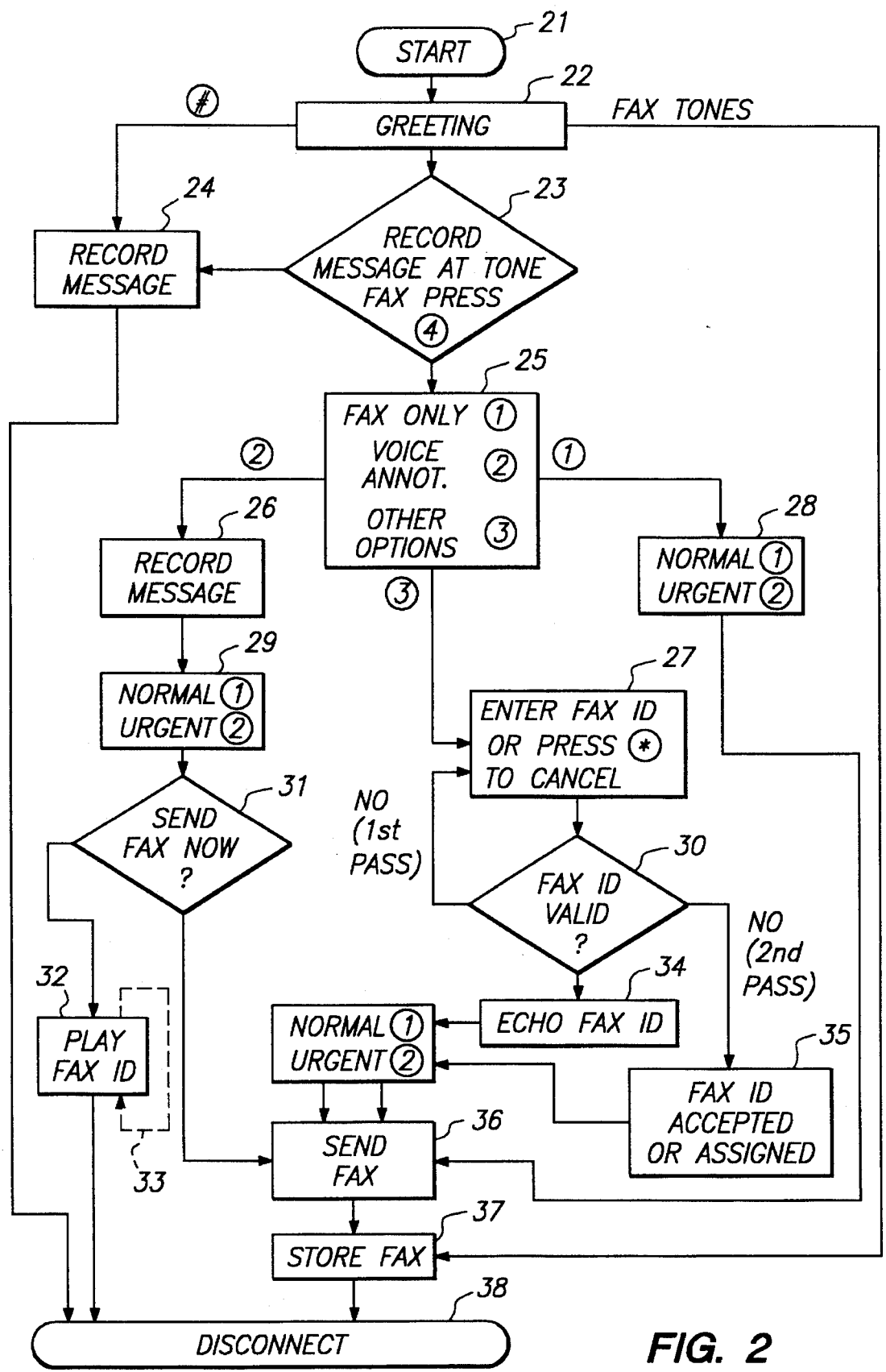
FIG. 2 is a process schematic diagram depicting the processing methodology and structure of the present invention whereby a composite voice/data message can be created by a caller by non-simultaneously recording a voice message and sending a timewise separated facsimile transmittal to the system shown in FIG. 1.

Furthermore, the digital line card constructed in accordance with the present invention enables the process of the present invention to be practiced using commercially available voice processing systems, such as the above-mentioned Aspen system, simply by replacing the pre-existing line card and modifying the system programming in accordance with the process shown in FIG. 2.

Each subscriber to voice messaging/data storage system 10 has a message hierarchy or "mailbox" associated with his telephone extension. The subscriber profile stored on data storage device 15 contains a variety of information that is used by the system to manage the subscriber's individual mailbox, such as the subscriber's password and information relating to the status and location within storage device 15 of the user's greeting and stored messages.

In accordance with the present invention, composite voice/data message identification numbers are provided which are specific to each subscriber's mailbox. For example, for a three-digit message identification numbering scheme, each subscriber can receive voice, facsimile or composite voice/data messages numbered between 001 and 999. The actual number of such messages resident in a subscriber's mailbox at any one time will of course be limited by the total storage capability of storage means 15.

The message identification numbers assigned to each subscriber's mailbox may comprise two classes: a first class, for example numbers 001 through 099, which are subscriber-assignable; and a second class, for example numbers 100 through 999, which are assigned by the system. The subscriber-assignable numbers may be given by the subscriber to a potential caller, so that the subscriber knows that when a message is received, it will have a "known" message identification number. System-assignable numbers, on the other hand, may be assigned by the voice messaging/data storage system 10 in a first-available sequential order. This sequence "wraps around" after 999 to 100 or the next higher currently unused system-assignable number.

A system constructed in accordance with the present invention enables a caller to first call into a recipient-subscriber's voice messaging data storage system and record a message concerning a specific facsimile transmittal. The caller later sends the facsimile transmittal to that storage system using facsimile equipment. The timewise separated voice message and facsimile transmittal are then linked by the recipient's system. Thus, when the subscriber calls into the system, he is apprised of the existence of a composite voice/data message in his mailbox.

A message identification number is used by the system to link up the timewise separated voice message and facsimile transmittal. In a first embodiment, the caller records a voice message before sending the facsimile transmittal, and then informs the system that he intends to later send a facsimile transmission. If the caller informs the system that the recorded voice message is to be annotated to a later transmitted facsimile image, the system provides the caller with a message identification number. When the same or a different caller again calls to send the facsimile transmittal, the system prompts the caller to enter the previously-provided message identification number, and then prompts the caller to start transmission of the facsimile image. The system uses the message identification number to match the voice portion of the message with the facsimile transmittal to form the composite voice/data message that is presented to the subscriber.

With the foregoing overview in mind, the detailed operation of the system can best be understood by referring to FIG. 2, which depicts a process diagram for creating a composite voice/data message either simultaneously or non-simultaneously. In the illustrative sequence of steps shown in FIG. 2, the composite voice/data message is created by first recording the voice message and then later sending the facsimile transmittal. As will be readily apparent from the description provided hereinafter, this sequence could be reordered, so that the facsimile transmittal precedes the voice message.

Each incoming telephone call is processed by the system in accordance with the process steps beginning at block 21 and ending at block 38. When a caller telephones a recipient who is absent, the call is acquired by the recipient-subscriber's voice messaging/data storage system. The caller is greeted at block 22 with a standard greeting, for example, announcing the recipient's name and his present unavailability. The system plays a prompt that interrogates the caller to determine which features of the system the caller desires to access, represented by decision block 23. For example, the prompt may state:

"To record a voice message, please wait for the tone. When you have finished recording, you may hang up or press 1 for more options. To send a fax message or record a voice annotation for a fax message, press 4 now"

If no action is taken by the caller in response to this prompt, control passes to block 24 and the system switches to record mode to record a voice message for storage in the subscriber's voice mailbox. Once the caller has completed his message, as typically determined by a silence period of preselected length following speech, the caller is disconnected, block 38. The recorded voice message is stored in electronic format for later playback by the recipient.

The caller may interrupt the system prompt at block 22 by pressing any of a number of keys, for example: the "#" key to skip the remainder of the greeting and go to record mode; the "0" key to transfer to the operator; or the "4" key to go directly to the options offered at block 25. In addition, receipt of fax tones during the greeting will activate system digital line card 12 and CPU 11 to switch operation directly to facsimile reception mode, block 37, described hereinafter.

If the caller presses the "4" key after the prompt at block 23, the caller is presented with a series of options, represented by decision block 25. At block 25, the system plays a prompt such as:

"Here are your options:

To send a fax without a voice annotation, press 1.

To record a voice annotation for a fax message, press 2.

To send a fax with an assigned Fax ID, press 3.

To exit, press *.

These options permit the user to elect to send a facsimile transmission without a voice annotation by pressing the "1" key, to record a voice annotation for a later facsimile transmission by pressing the "2" key, or to send the facsimile transmission portion of a composite voice/data message by pressing the "3" key. Pressing the "*" key returns the caller to block 23 to permit recording of a simple voice message.

If the caller presses the "1" key, control passes to block 28, where the system may offer the caller the option to designate the recorded facsimile transmission as having either normal priority, by pressing the "1" key, or urgent priority, by pressing the "2" key. Thus the system may play a prompt such as:

"To send your fax message with normal priority, press 1. To send your fax message with urgent priority, press 2."

Once a response is received from the caller, the call is transferred to block 36 and the system switches into facsimile transmission mode to receive data, as described below.

If, in response to the prompt at block 25, the caller instead presses the "2" key, control transfers to block 26 and the system switches to record mode to record a voice annotation for a composite voice/data message. The system also generates a composite voice/data message data structure to receive the voice and facsimile portions of the message. This structure may comprise, for example, data storage areas allocated for both voice and data components of the message, and a message identification number or table entry indicating correspondence between these data storage areas.

At the conclusion of the voice annotation recording made by the caller, as typically determined by a silence period of preselected length following speech, the system presents the caller with a series of options, represented by block 29, which provide different urgency attributes for the recorded voice annotation. For example, the system may offer the caller the option to designate the recorded voice message as either a normal voice annotation, by pressing the "1" key, or an urgent voice annotation for a fax message, by pressing the "2" key. Thus the system may play a prompt such as:

"To send your voice annotation message with normal priority, press 1. To send your voice annotation message with urgent priority, press 2."

Control then passes to decision block 31, where the system inquires of the caller whether the facsimile transmittal is to be simultaneous or non-simultaneous. The NO path emanating from decision block 31 in FIG. 2 indicates a non-simultaneous facsimile transmittal and the YES path indicates that the facsimile is to be sent as part of the same call. This inquiry of the caller may be made by playing a prompt such as:

"To send the fax image now, press 1. To send the fax image later, press 2."

As will be readily understood, in order to send the fax image simultaneously, i.e., to choose the "send the fax image now" option, the caller must be using the handset of the facsimile machine. If the caller indicates that the facsimile transmittal is to be sent during that same telephone call, the system prompts the caller to begin sending the facsimile transmittal, block 36, by playing a prompt such as:

"Check to make sure document is in the feeder of the fax machine. Then press the 'START' key on your fax machine."

The system then switches out of voice interactive mode to facsimile transmission receipt mode. Once the facsimile transmission is received, it is stored on the system in electronic format, block 37, and the call is disconnected, block 38. Where the facsimile transmittal is sent at the conclusion of the voice message, the system assigns the message identification number to each portion of the composite voice/data message that is used by the system for keeping track of the voice and data portions of the composite voice/data message, as described in greater detail hereinafter. Because the composite voice/data message is transmitted simultaneously, however, the message identification number need not be provided to the caller.

If at block 31 the caller instead chooses non-simultaneous transmission of the facsimile image, i.e., "send fax later" option, control passes to block 32, where the system provides the caller with a message identification number, denoted "FAX ID". This number, which may comprise, for example, three digits as described hereinabove, is assigned by the system to the voice message when the composite voice/data data structure is created. The message identification number is used to associate or match the voice and facsimile portions of the composite voice/data message when the facsimile transmittal portion of the message is later received.

The caller must take note of the message identification number, as it is required later when the facsimile transmittal is to be sent. Accordingly, the system will, upon request, repeat the message identification number as many times as desired by the caller so that the caller can confirm he has accurately jotted it down, illustrated by loop 33 of FIG. 2. For example, the system may play:

"The FAX ID of this message is . . . . To replay the FAX ID, press 1. To continue, press 2."

When the caller has noted the message identification number, he presses the "2" key, and control passes to block 38, where the call is terminated.

Further in accordance with the present invention, the caller completes a non-simultaneous composite voice/data message by having his secretary, or the office mail center, again call the recipient's telephone number, block 21 using a facsimile machine keypad. When the voice messaging/data storage system acquires control of the line, the system again plays its standard greeting, block 22 of the process of FIG. 2. The caller again presses the "4" key so that control passes to block 25. This time, however, the caller presses the "3" key in response to the system prompt at block 25, indicating his intention to send a facsimile transmittal corresponding to the earlier recorded voice annotation.

Upon receipt of the tone corresponding to the "3" key being pressed, control passes to block 27, where the system plays a prompt requesting that the caller enter the message identification number of the previously recorded voice annotation. For example, the system may play a prompt such as:

"Please enter the FAX ID. To cancel, press *."

Pressing the "*" key in response to this prompt causes control to return to block 25, so that the caller may make a different selection.

Otherwise, the caller enters the message identification number by pressing the numbers on his telephone keypad corresponding to the sequence of numbers in the FAX ID. For example, if the message identification number were "365", the caller would press the "3", "6" and "5" keys on his telephone, in that order.

Once the three-digit message number has been received by the system, block 27 passes control to decision block 30, where the stored voice messages are checked to determine whether the message identification number entered by the caller is valid. For example, when a caller enters the three-digit number at block 27, the system checks a table of message entries associated with the subscriber's mailbox.

If the check of the entries table shows that a voice message having the corresponding message identification number has already been received and that there is a composite voice/data data structure stored on the system awaiting a facsimile image, the message identification number is deemed valid. The system first plays a prompt echoing the message identification number provided by the caller, block 34. Control then passes to block 36, and the user is prompted to begin sending his facsimile transmission. Such prompts may consist of, for example:

"To send the fax image now with FAX ID . . . . Check to make sure that the document is in the feeder of the fax machine. Press the 'START' key on your fax machine."

The incoming facsimile transmittal is then cataloged as corresponding to the previously recorded voice message. When the recipient-subscriber calls into the system to receive his messages, the system informs him of the existence of the composite voice/data message.

Alternatively, if no corresponding voice message portion of the composite voice/data message is resident in active memory, the system may perform a series of checks, such as searching the archive memory associated with that subscriber's mailbox to determine whether the voice portion of the composite voice/data message was recorded much earlier, received by the subscriber, and then archived. If the voice message has been archived by the subscriber, it is retrieved into active memory as part of the composite voice/data message.

If at block 30 the message identification number entered by the caller is deemed not to be a valid message identification number for a composite voice/data message, the system informs the caller that the message identification number is invalid and prompts the caller to enter a new number. For example, if the message identification number provided by the caller is out of range, the system might play a prompt such as:

"Sorry, the FAX ID you have entered is out of range. Please enter an ID between 1 and 999."

Alternatively, the caller may have erroneously entered a message identification number for which there is already a complete composite voice/data message resident in storage. In that case, the system might play a prompt such as:

"Sorry, a fax image with that FAX ID already exists in this mailbox."

Yet again, the caller may have erroneously entered a message identification number for which there is no matching recorded voice annotation. In that case, the system might play a prompt such as:

"Sorry, there is no fax annotation with this FAX ID."

After any of the foregoing out-of-range, duplicate ID, or non-existent voice annotation prompts are played, the system might play a prompt such as:

"To enter another FAX ID, press 1. To let the system assign a FAX ID, press 2."

This procedure is illustrated in FIG. 2 by the "1st pass" process arrow. If the caller again enters the same message identification number, the system again notes that the number is invalid and control transfers over path "2nd pass" to block 35.

At block 35, the system informs the caller that it will accept the number if it is not out-of-range or a duplicate ID. If the FAX ID entered by the caller is a duplicate or out-of-range, the system automatically assigns a new message identification number to the facsimile transmittal and echoes that number back to the caller. Control then passes to block 36, where the system assigns the impending facsimile transmittal the message identification number entered by the caller and prompts the caller to initiate the facsimile transmittal. Upon receipt of the facsimile transmittal by the system, control passes to block 37, where the facsimile transmittal is stored in electronic format. The caller is then disconnected, block 38.

Alternatively, if the facsimile transmittal is being sent by a facsimile machine operating in automatic mode, i.e., unattended, the message identification number could be embedded in the dial string for the transmission. If the capability to receive facsimile images from facsimile machines operating in automatic mode is desired, the system should provide a protocol for monitoring the line for tones corresponding to the message identification number, as described hereinabove.

When the system subscriber calls into the system to review his messages, he is informed of the existence of voice messages, facsimile transmittal messages, and composite voice/data messages. The subscriber may then, for example, listen to the voice portion of a composite voice/data message, and direct output of the facsimile portion of the message to a subscriber-designated facsimile machine 17 (as shown in FIG. 1).

Further in accordance with the present invention, the system includes programming that provides a banner or cover page for a printed out facsimile transmittal. Thus, when the subscriber designates the printer or facsimile machine at which the facsimile portion of the composite voice/data message is to be printed out, the system includes into the print stream a cover page for the print out that includes the message identification number of the composite voice/data message from which the print out was obtained. Accordingly, when the subscriber receives the print out of the facsimile portion of the composite voice/data message, he can replay the voice message portion of the message while simultaneously examining the facsimile portion of the message.

Alternatively, the subscriber could direct the system to re-transmit the facsimile portion of the composite voice/data message to a local workstation 18 (as shown in FIG. 1), for example, a personal computer connected to the system via modem, and configured to send and receive facsimile transmittals.

The priority attributions that may be selected by the caller at blocks 28 and 29 do not constitute a part of the present invention, since the ability to assign an priority level to a voice message exists in previously known commercial systems. The extension of such an attribution scheme to the non-simultaneous voice annotation feature of the present invention, however, does require additional consideration. This is because the potential exists to separately create a voice annotation portion and a data portion of a single composite voice/data message wherein different priority levels are assigned to the separate parts of the voice/data message when they are created.

Accordingly, the apparatus of the present invention further includes programming to override incongruous priority assignments for the voice portion and data portion of a composite voice/data transmittal. Thus, for example, if either the voice message or the facsimile transmittal portion were assigned urgent priority, the composite voice message would be assigned urgent priority.

The priority assignment scheme discussed above with respect to FIG. 2 does not otherwise affect the functioning of the system. Rather, the priority codes simply change the order in which messages are presented for review in the subscriber's mailbox, with the pendency of all urgent messages being announced to the user before the normal priority messages.

It will be understood by those skilled in the art that, the present invention is not limited to creating non-simultaneous composite voice/data messages in the sequence illustrated in FIG. 2, but also includes reversing the sequence of sending the facsimile transmittal, getting a message identification number from the system, and then recording a voice message on the system. It would be a simple matter for one skilled in the techniques of computer programming to adapt the process diagram of FIG. 2 to associate first-received facsimile transmittals with timewise separated later voice message recordings to create a composite voice/data message.

One skilled in the art will appreciate that the present invention can be practiced by other than the described embodiments, and that the present invention is limited only by the claims that follow.

What is claimed is:

1. A method by which a recipient's messaging system non-simultaneously receives a voice message and image data, and creates a composite voice and data message in electronic format for storage in, and subsequent retrieval by the recipient from, a mailbox assigned to the recipient, the mailbox comprising a data structure in an information storage system of the messaging system, the method comprising the steps of:

during a first call, recording the voice message in electronic format on the information storage system;

selecting an available message identification number associated with the mailbox;

during a second call, distinct from the first call, receiving the image data for storage on the information storage system; wherein the second call occurs either prior to or subsequent to the first call;

providing the message identification number to a caller during the earlier of the first and second calls and accepting, from the caller, the message identification number during the later of the first and second calls;

assigning a first priority level to the voice message in response to caller input during the first call and assigning a second priority level to the image data in response to caller input during the second call, wherein the first and second priority levels correspond to either urgent priority or non-urgent priority; and associating the image data with the voice message using the message identification number to create a composite voice and data message within the mailbox assigned to the recipient.

2. The method of claim 1 wherein the step of associating the image data with the voice message further comprises the steps of:

determining that the message identification number provided to the caller during the earlier of the first and second calls matches the message identification number accepted from the caller during the later of the first and second calls; and generating an entry in the information storage system indicating that the voice message and image data are parts of one composite voice and data message.

3. The method of claim 2 further comprising the steps of comparing the priority level assigned to the voice message to the priority level assigned to the image data, and designating the composite voice and data message as having urgent priority if the priority level of either the voice message or the image data is assigned urgent priority.

4. A messaging system used by a recipient, that enables a caller to create a composite voice and data message in electronic format for storage in, and subsequent retrieval by the recipient from, a mailbox assigned to the recipient, wherein the mailbox comprises a data structure in an information storage system of the messaging system, and wherein the composite voice and data message includes a voice message portion and an image data portion, the messaging system comprising:

means for recording a voice message in electronic format during a first call;

means for receiving image data during a second call, distinct from the first call, and storing the image data in electronic format, wherein the second call occurs either prior to or subsequent to the first call;

means for providing pre-programmed prompts to the caller during the earlier of the first and second calls that inquire whether the caller desires to create a composite voice and data message;

means for creating a composite voice and data data structure responsive to a reply of the caller to the pre-programmed prompts;

means for selecting and storing a message identification number associated with the mailbox and which is specific to either the voice message or the image data, whichever was received first by the messaging system;

means for providing the message identification number to the caller during the earlier of the first and second calls;

means for accepting from the caller during the later of the first and second calls the message identification number provided to the caller during the earlier of the first and second calls; and means employing the message identification number for associating the image data with the voice message to create a composite voice and data message and for storing the composite voice and data message in the recipient's mailbox, wherein the voice message forms the voice message portion of the composite voice and data message and the image data forms the image data portion of the composite voice and data message.

5. The messaging system as defined in claim 4 further comprising means for the caller to assign a priority level to each of the voice message and the image data, wherein the priority level can be assigned as an urgent priority or non-urgent priority.

6. The messaging system as defined in claim 5 further comprising means for comparing the priority level assigned to the voice message to the priority level assigned to the image data, and designating the composite voice and data message as having urgent priority if either the voice message or the image data is assigned urgent priority.

7. The messaging system as defined in claim 4 wherein the means for selecting further comprises means for enabling the recipient to pre-designate the message identification number.

8. The messaging system as defined in claim 4 further comprising means for enabling the recipient to access and listen to the voice message portion of the composite voice and data message.

9. The messaging system as defined in claim 8 further comprising means for enabling the recipient to direct transmission of the image data portion of the composite voice and data message to a facsimile machine selected by the recipient.

10. The messaging system as defined in claim 9 further comprising means for providing a cover letter for the image data portion of the composite voice and data message directed to the facsimile machine selected by the recipient, wherein the cover letter bears the message identification number.

11. The messaging system as defined in claim 8 further comprising means for enabling the recipient to direct transmission of the image data portion of the composite voice and data message to a computer workstation selected by the recipient.

12. A messaging system, employed by a recipient, that allows a caller to non-simultaneously create a composite voice and data message in electronic format for storage in a mailbox assigned to the recipient, the mailbox comprising a data structure in an information storage system of the messaging system, and the composite voice and data message including a voice message portion and an image data portion, the messaging system comprising:

means for receiving and storing the image data portion in electronic format;

means for providing pre-programmed prompts to the caller, that inquire whether the caller desires to create a composite voice and data message;

means for receiving, from the caller, responses to the pre-programmed prompts;

means for selecting and storing a message identification number, wherein the message identification number is a next available message identification number assigned to the mailbox and is specific to the image data;

means for creating in the mailbox a composite voice and data data structure responsive to the caller's responses to the preprogrammed prompts;

means for providing the message identification number to the caller, responsive to the caller's responses to the preprogrammed prompts;

means for prompting the caller to enter the message identification number before or after recording the voice message portion;

means for recording the voice message portion in electronic format; and means employing the message identification number for associating the image data portion with the voice message portion to create the composite voice and data message.

13. The messaging system as defined in claim 12 further comprising means for enabling the recipient to access and listen to the voice message portion of the composite voice and data message.

14. The messaging system as defined in claim 13 further comprising means for enabling the recipient to direct transmission of the image data portion of the composite voice and data message to a facsimile machine selected by the recipient.

15. The messaging system as defined in claim 14 further comprising means for providing a cover letter for the image data portion of the composite voice and data message directed to the facsimile machine selected by the recipient, wherein the cover letter bears the message identification number.

16. The messaging system as defined in claim 14 further comprising means for enabling the recipient to direct transmission of the image data portion of the composite voice and data message to a computer workstation selected by the recipient.

17. A method by which a recipient's messaging system non-simultaneously receives a voice message and image data, and creates a composite voice and data message on an information storage system for subsequent retrieval by the recipient, the method comprising the steps of:

accepting a first call from a first caller and establishing a first connection to the information storage system;

receiving a voice message from the first caller, during the first call, for recording in electronic format on the information storage system;

receiving from the first caller a priority level and assigning the priority level to the voice message, wherein the priority level corresponds to urgent priority or non-urgent priority;

audibly providing to the first caller a message identification number;

terminating the first connection and the first call;

accepting a second call from a second caller and establishing a second connection to the information storage system;

accepting, from the second caller, the message identification number;

receiving image data from the second caller, during the second call, for storage to the information storage system; and receiving from the second caller a priority level and assigning the priority level to the image data, wherein the priority level corresponds to urgent priority or non-urgent priority;

associating the image data with the voice message using the message identification number to create a composite voice and data message for storage within the mailbox of the recipient.

18. The method of claim 17 wherein the step of associating the image data with the voice message further comprises the step of:

a. determining that the message identification number provided during the first call matches the message identification number accepted during the second call; and b. generating an entry in the information storage system indicating that the voice message and image data are parts of the composite voice and data message.

19. The method of claim 17 further comprising the steps of comparing the priority level assigned to the voice message to the priority level assigned to the image data, and designating the composite voice and data message as having urgent priority if the priority level of either the voice message or the image data is assigned urgent priority.

20. A messaging system that provides for the creation of a composite voice and data message in electronic format for storage in a mailbox assigned to a recipient, the mailbox comprising a data structure in an information storage system of the messaging system, and the composite message including a voice message portion created by a first caller during a first call into the messaging system and an image data portion created by a second caller during a subsequent call into the messaging system, the messaging system comprising:

means for recording a voice message by the first caller in electronic format during the first call;

means for providing pre-programmed prompts to the first caller that inquire whether the first caller desires to create a composite voice and data message;

means for receiving a reply to the preprogrammed prompts from the first caller;

means for creating a composite voice and data data structure responsive to the reply indicating that the first caller desires to create a composite voice and data message;

means for generating and storing a message identification number, wherein the message identification number is specific to the voice message;

means for audibly providing the message identification number to the first caller;

means for prompting the second caller, during the subsequent call, to enter the message identification number and then begin transmitting image data to the messaging system;

means for accepting, from the second caller, the message identification number;

means for receiving and storing image data in electronic format during the subsequent call; and means employing the message identification number for associating the image data with the voice message to create the composite voice and data message within the recipient's mailbox, wherein the voice message forms the voice message portion of the composite voice and data message and the image data forms the image data portion of the composite voice and data message.

21. The messaging system as defined in claim 20 further comprising means for the first caller to assign a priority level corresponding to either urgent priority or non-urgent priority to the voice message and for the second caller to assign a priority level corresponding to either urgent priority or non-urgent priority to the image data.

22. The messaging system as defined in claim 21 further comprising means for comparing the priority level assigned to the voice message to the priority level assigned to the image data, and designating the composite voice and data message as having urgent priority if either the voice message or the image data is assigned urgent priority.

23. The messaging system as defined in claim 20 wherein the means for generating a message identification number comprises means to select a next available message identification number assigned to the mailbox.

24. The messaging system as defined in claim 20 wherein the means for selecting further comprises means for enabling the recipient to pre-designate the message identification number.

25. The messaging system as defined in claim 20 further comprising means for enabling the recipient to access and listen to the voice message portion of the composite voice and data message.

26. The messaging system as defined in claim 25 further comprising means for enabling the recipient to direct transmission of the image data portion of the composite voice and data message to a facsimile machine selected by the recipient.

27. The messaging system as defined in claim 26 further comprising means for providing a cover letter for the image data portion of the composite voice and data message directed to the facsimile machine selected by the recipient, wherein the cover letter bears the message identification number.

28. The messaging system as defined in claim 25 further comprising means for enabling the recipient to direct transmission of the image data portion of the composite voice and data message to a computer workstation selected by the recipient.

29. The messaging system as defined in claim 20 wherein the first caller and the second caller are one and the same person.

30. A method by which a messaging system non-simultaneously receives a voice message and image data, and creates a composite voice and data message on an information storage system in the messaging system for subsequent retrieval by a recipient, the method comprising the steps of:

accepting a first call from a first caller and establishing a first connection to the information storage system;

providing pre-programmed prompts to the first caller that inquire whether the first caller desires to create a composite voice and data message;

receiving, from the first caller, responses to the pre-programmed prompts;

recording a voice message during the first call and storing the recorded voice message in the information storage system;

audibly providing, to the first caller, a message identification number, responsive to the first caller's responses to the pre-programmed prompts;

terminating the first call and the first connection;

accepting a second call from a second caller and establishing a second connection to the information storage system;

accepting, from the second caller, the message identification number;

receiving image data during the second call and storing the received image data in the information storage system; and associating the voice message with the image data using the message identification number to create a composite voice and data message in the mailbox of the recipient.

\* \* \* \* \*